United States Patent
Tsurufuji et al.

(10) Patent No.: US 6,505,430 B1
(45) Date of Patent: Jan. 14, 2003

(54) INTRA-LINE FISHING ROD

(75) Inventors: Tomoyoshi Tsurufuji, Saitama (JP); Hiroyuki Ono, Kanagawa (JP)

(73) Assignee: Daiwa Seiko Inc., Tokyo (JP)

(*) Notice: Subject to any disclaimer, the term of this patent is extended or adjusted under 35 U.S.C. 154(b) by 0 days.

(21) Appl. No.: 09/350,290

(22) Filed: Jul. 9, 1999

Related U.S. Application Data

(62) Division of application No. 08/524,283, filed on Sep. 6, 1995, now Pat. No. 5,926,992.

(30) Foreign Application Priority Data

Sep. 6, 1994 (JP) .............................................. 6-238527
Apr. 14, 1995 (JP) .............................................. 7-113772

(51) Int. Cl.$^7$ ............................................ A01K 87/00
(52) U.S. Cl. .......................................... 43/18.1; 43/18.5
(58) Field of Search ................................. 43/18.1, 18.5

(56) References Cited

U.S. PATENT DOCUMENTS

| | | | | |
|---|---|---|---|---|
| 386,321 A | * | 7/1888 | Horton ........................ | 43/18.1 |
| 2,541,609 A | | 2/1951 | Pullan | |
| 2,602,766 A | * | 7/1952 | Francis ........................ | 43/18.1 |
| 4,043,074 A | * | 8/1977 | Airhart ........................ | 43/18.5 |
| 4,061,806 A | * | 12/1977 | Lindler ........................ | 43/18.5 |
| 4,083,140 A | * | 4/1978 | Van Auken .................. | 43/18.5 |
| 4,133,708 A | * | 1/1979 | Tokuno ........................ | 43/18.5 |
| 4,178,713 A | * | 12/1979 | Higuchi ........................ | 43/18.5 |
| 4,355,061 A | | 10/1982 | Zeigler | |
| 4,653,216 A | * | 3/1987 | Inoue ........................... | 43/18.5 |
| 4,759,147 A | * | 7/1988 | Pirazzini ...................... | 43/18.5 |
| 4,885,865 A | * | 12/1989 | Rumbaugh .................. | 43/18.5 |
| 5,076,004 A | | 12/1991 | Sunaga | |
| 5,241,773 A | * | 9/1993 | Burgh ........................... | 43/18.1 |
| 5,245,779 A | * | 9/1993 | Suzue ........................... | 43/18.5 |
| 5,299,377 A | | 4/1994 | Akiba | |
| 5,328,742 A | * | 7/1994 | Tukihara ....................... | 43/18.1 |
| 5,338,604 A | | 8/1994 | Yasui | |
| 5,592,771 A | | 1/1997 | Kim | |
| 5,592,772 A | * | 1/1997 | Kim ........................... | 43/18.1 |

FOREIGN PATENT DOCUMENTS

| | | | | |
|---|---|---|---|---|
| CZ | 80651 | 6/1951 | | |
| DE | 2659003 | * 10/1977 | ................ | 43/18.5 |
| DE | 3841228 | 6/1989 | | |
| FR | 1334399 | 11/1968 | | |
| FR | 92821 | 1/1969 | | |
| FR | 2619340 | 2/1989 | | |
| FR | 2695295 | 3/1994 | | |
| GB | 1259820 | * 1/1972 | ................ | 43/24 |
| GB | 1362531 | 7/1974 | | |
| GB | 1362531 | 8/1974 | | |
| GB | 2119611 | 11/1983 | | |
| GB | 1351732 | * 9/1988 | ................ | 43/18.5 |
| GB | 2206307 | 1/1989 | | |
| GB | 00225412 | 6/1992 | | |
| IT | 553616 | 4/1958 | | |
| JP | 2280026 | 12/1987 | | |
| JP | 3049426 | 3/1988 | | |
| JP | 3212540 | * 9/1988 | ................ | 43/18.5 |
| JP | 2081624 | 3/1990 | | |
| JP | 3143463 | 6/1991 | | |
| WO | 9611683 | 10/1990 | | |

* cited by examiner

*Primary Examiner*—Kurt Rowan
(74) *Attorney, Agent, or Firm*—Liniak, Berenato & White

(57) ABSTRACT

The invention concerns an intra-line fishing rod which can both reduce the insertion resistance of a fishline and maintain a delicate flexible property. In the intra-line fishing rod with an inserted fishline, the inside diameter of the respective portions (a, b, c) of the top rod portion of the fishing rod is formed in a substantially straight shape having an inclination of $3/1000$ or less, and reinforcing fibers having different elastic moduli are used in the rod top portions and are sequentially arranged in such a manner not only that the reinforcing fibers extend substantially in the axial direction of the rod top portions but also that the elastic moduli become higher in a geometric series manner from the front portion (a) toward the rear portion (c).

1 Claim, 3 Drawing Sheets

INTRA-LINE FISHING ROD

This is a division of Application Ser. No. 08/524,283, filed Sep. 6, 1995, now U.S. Pat. No. 5,926,992.

The present invention relates to an intra-line fishing rod which is characterized by a rod top portion.

Every fishing rod has its own flexible characteristic which can be set according to its fishing targets, for example, a fishing rod for small-size fish is formed such that it has a delicate flexible characteristic.

However, in an intra-line fishing rod, since a fishline is inserted through the interior of the rod tube and also since the resistance of the fishline must be reduced, in the rod top portion of the fishing rod, the inside diameter of the rod tube cannot be reduced so much. If the inside diameter of the rod top portion is large, a delicate flexibility cannot be provided and, for this reason, conventionally, it is difficult to manufacture an intra-line fishing rod having a delicate flexible characteristic.

SUMMARY OF THE INVENTION

In view of the above, it is an object of the invention to form a fishing rod having a delicate flexible characteristic into an intra-line fishing rod which can reduce the insertion resistance of a fishline while maintaining the delicate flexible characteristic thereof.

In attaining the above object, according to the invention, there is provided an intra-line fishing rod using synthetic resin as a matrix and reinforced with reinforcing fibers, in which a rod top portion of the fishing rod is formed substantially in a straight shape with the inside diameter thereof having an inclination of $3/1000$ or less, reinforcing fibers respectively having different moduli of elasticity are sequentially disposed in the rod top portion in such a manner that the reinforcing fibers extend substantially in the axial direction of the rod top portion, and the elastic moduli increase sequentially in a geometric series manner from the front portion of the rod top portion toward the rear portion thereof.

In the fishing rod, since the inside diameter of the rod top portion is formed substantially straight, the inside diameter of the front portion of the rod top portion can be set large and thus there can be provided a hollow portion through which a fishline can pass freely, thereby being able to provide a fishline insertable structure which can reduce the resistance of the fishline. However, in this structure, as it is, the flexural rigidity of the front portion of the rod top portion is high and is thus difficult to flex. Therefore, by selecting the reinforcing fibers in such a manner that the elastic moduli of the substantially axially extending reinforcing fibers, which contribute to the flexural rigidity, increase sequentially in a geometric series manner from the front portion to the rear portion (that is, the front portion is easy to flex), even if the front portion of the rod top portion is relatively large in diameter, similarly when the front portion of the rod top portion is tapered, the front portion of the rod top portion can be flexed easily and delicately.

Here, the term "sequence" used in this specification relates to reinforcing fibers which are used as main reinforcing fibers except for reinforcing fibers such as auxiliary prepregs used for partial reinforcement in the guide fixation and the like.

Also, according to the invention, there is provided an intra-line fishing rod in which a layer of reinforcing fibers extending substantially in the circumferential direction of the rod top portion is provided as an inner layer, an outer layer or an intermediate layer of the reinforcing fibers extending substantially in the axial direction of the rod top portion.

In the structure of the fishing rod, when two or more kinds of the above-mentioned substantially axially extending reinforcing fibers are sequentially disposed, it is true that the connecting portions thereof are weak, but, if there is provided a layer of reinforcing fibers extending substantially in the peripheral direction of the rod top portion, then the connecting portions can be reinforced without interfering the delicate flexure thereof and can be prevented against crushing rupture.

Further, according to the invention, there is provided an intra-line fishing rod including a rod top portion which has a matrix formed of synthetic resin and is reinforced not only with reinforcing fibers extending substantially in the axial direction of the top rod portion within the range of angles of ±30° with respect to the axial direction of the rod top portion but also reinforcing fibers extending substantially in the peripheral direction of the rod top portion within the range of angles of ±45° with respect to the circumferential direction of the rod top portion, in which the inside diameter of the rod top portion is formed in a substantially straight shape or in a gently tapered shape, and the ratio of the reinforcing fibers extending in said substantially peripheral direction in the front portion of the rod top portion is 50% or greater while the ratio of the reinforcing fibers in the rear portion of the rod top portion is smaller.

According to the fishing rod, since the inside diameter of the rod top portion is formed substantially straight or in a gentle taper, the inside diameter of the front portion of the rod top portion can be set large and thus there can be provided a hollow portion through which a fishline can pass freely, thereby being able to provide a fishline insertable structure which can reduce the resistance of the fishline. However, in this structure, as it is, the flexural rigidity of the front portion of the rod top portion is high and is thus difficult to flex. In view of this, in the front portion of the rod top portion, the ratio of the reinforcing fibers extending substantially in the peripheral direction of the rod top portion is set for 50% or more while the ratio of the reinforcing fibers extending in the longitudinal direction is set smaller; and, on the other hand, in the rear portion of the rod top portion, the ratio of the reinforcing fibers extending substantially in the peripheral direction is set small while the ratio of the longitudinally extending reinforcing fibers is set large. Since the characteristic of flexure depends on the longitudinally extending reinforcing fibers, the smaller the ratio of the longitudinally extending reinforcing fibers is, the lower the rigidity is; that is, there can be provided a fishing rod which is easy to flex. Therefore, even if the rod top portion is large in diameter, the flexing property thereof can be made delicate similarly to a tapered rod top portion. In this specification, the term "gentle taper" is used to express a taper in the range of $3/1000$ to $5/1000$.

According to the invention, there is provided an intra-line fishing rod including a matrix formed of synthetic resin, reinforced with reinforcing fibers, and including a main body layer of a rod top portion having reinforcing fibers extending substantially in the axial direction of the rod top portion, in which the amount of the reinforcing fibers extending substantially in the axial direction in the front portion of the rod top portion is set smaller while the amount of the reinforcing fibers in the rear portion of the rod top portion is set greater, the ratio of the synthetic resin in the front portion of the rod top portion is set greater while the ratio of the synthetic resin in the rear portion of the rod top portion is set smaller, and the inside diameter of the rod top portion is formed in a substantially straight shape or in a gently tapered shape.

Since the inside diameter of the rod top portion is formed substantially straight or in a gentle taper, the inside diameter of the front portion of the rod top portion can be set large and thus there can be provided a hollow portion through which a fishline can pass freely, thereby being able to provide a fishline insertable structure which can reduce the insertion resistance of the fishline. However, in this structure, as it is, the flexural rigidity of the front portion of the rod top portion is high and is thus difficult to flex. In view of this, in the front portion of the rod top portion, the reinforcing fibers extending substantially in the axial direction thereof are small in quantity, whereas the reinforcing fibers extending substantially in the axial direction are large in quantity. Also, in order to reinforce the rod tube against crushing rupture, a larger ratio of synthetic resin is used in the front portion of the rod top portion while a smaller ratio of synthetic resin is used in the rear portion of the rod top portion to thereby keep the strength of the rod tube. Since the flexural property depends on the reinforcing fibers extending substantially in the axial direction, according to the present structure, there can be provided a fishing rod which is easier to flex in the front portion of the rod top portion, and the flexural property of the present top rod portion can be made as delicate as a tapered rod top portion.

According to the invention, there is provided an intra-line fishing rod including a rod top portion, the rod top portion being structured such that synthetic resin is used as a matrix, reinforcing fibers are disposed such that they extend in an inclined direction with the angles of inclination in the range of 5 degrees to 25 degrees with respect to the axial direction of the rod top portion, the reinforcing fibers crossing each other from both right and left directions substantially symmetrically with respect to the axial direction, and the crossing reinforcing fibers occupy almost all of the reinforcing fibers that are used in the rod top portion.

Since the crossing reinforcing fibers are disposed substantially symmetrically, the rod top portion can be prevented from being twisted. And, the axially extending components of the obliquely extending reinforcing fibers contribute to the axial direction, the flexural rigidity in flexing can be controlled down to a low level to thereby be able to provide a large inside diameter accordingly. Also, since the reinforcing fibers extend obliquely, they also have a component which contributes to the peripheral direction, thereby being able to prevent the rod top portion against crushing rupture. The peripheral direction contributing components of the reinforcing fibers cooperate with the axial direction contributing components thereof can prevent the rod top portion from being plastically deformed when it is flexed greatly.

According to the invention, there is provided an intra-line fishing rod including a rod top portion, the rod top portion being structured such that synthetic resin is used as a matrix, reinforcing fibers are disposed such that they extend in an inclined direction with the angles of inclination of 5 degrees or greater with respect to the axial direction of the rod top portion and also such that they cross each other from both right and left directions substantially symmetrically with respect to said axial direction, and a smaller amount of reinforcing fibers than the amount of the crossing reinforcing fibers are disposed so as to extend substantially in the axial direction, or reinforcing fibers having a lower elastic modulus than the crossing reinforcing fibers are disposed so as to extend substantially in said axial direction.

According to the fishing rod, the symmetric arrangement of the reinforcing fibers disposed crossingly from both directions prevents the rod top portion from being twisted. Since a smaller quantity of reinforcing fibers or reinforcing fibers having a low elastic modulus are used in the axial direction, the flexural rigidity of the top rod portion in flexing can be controlled down to a low level, which makes it possible to increase the inside diameter of the rod top portion accordingly. The existence of the reinforcing fibers crossing obliquely provides a component which contributes to the peripheral direction of the rod top portion, thereby being able to protect the rod top portion against crushing rupture. This cooperates with the existence of the axially extending reinforcing fibers to prevent the rod top portion from being deformed plastically when it is flexed greatly.

Also, according to the invention, there is provided an intra-line fishing rod including a rod top portion, the rod top portion being structured such that synthetic resin is used as a matrix, and reinforcing fibers are disposed so as to extend substantially in the axial direction of the rod top portion in such a manner that those of the reinforcing fibers having a large rupture elongation are disposed on the outer side of said rod top portion while those of the reinforcing fibers having a small rupture elongation are disposed on the inner side thereof.

According to the structure, it is generally known that a reinforcing fiber having a large breakage elongation is highly elastic while a reinforcing fiber having a small breakage elongation is low in elasticity. In view of this, in the present structure, since reinforcing fibers having a large breakage elongation are disposed on the outer side of the rod top portion while reinforcing fibers having a small breakage elongation are disposed on the inner side thereof, the rod top portion is easy to flex (the inside diameter of the rod top portion can be increased) but is difficult to be plastically deformed.

Further, according to the invention, there is provided an intra-line fishing rod including a rod top portion, the rod top portion structured such that, there is provided a spirally shaped member through which a fishline can be inserted, and a cylindrical member is provided so as to cover the outer side of the spirally shaped member, the cylindrical member being formed of material having a lower elastic modulus than the spirally shaped member. The term "spirally shaped member" used here includes a member which is produced by connecting a plurality of ring members with a longitudinally extending member.

Since the spirally shaped member is very small in flexural rigidity and the cylindrical member covering the spirally shaped member is also formed of a material having a low elastic modulus, the rod top portion can be enhanced in flexibility and thus the inside diameter of the rod top portion can be increased accordingly. Also, the presence of the spirally shaped member provides a high strength against crushing rupture.

DETAILED DESCRIPTION OF THE PREFERRED EMBODIMENTS

Now, description will be given below in more detail of the present invention in compliance with the embodiments thereof respectively shown in the accompanying drawings.

Figure 1:
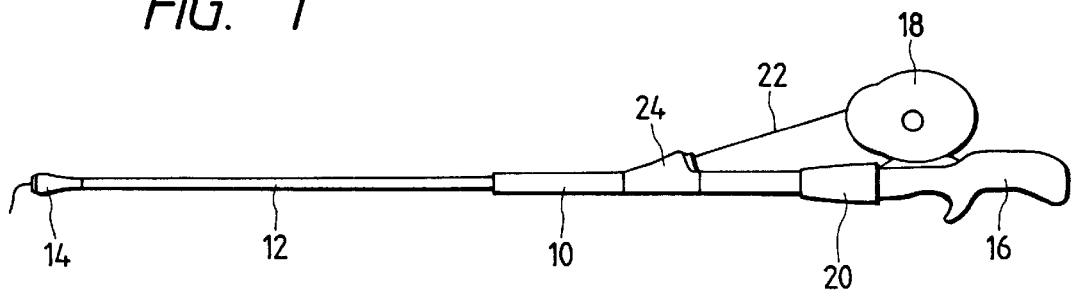
FIG. 1 is a side view of an embodiment of an intra-line fishing rod according to the invention.

At first, FIG. 1 shows an embodiment of an intra-line fishing rod according to the invention. In FIG. 1, a base rod 10 is fixed to the front portion of a casting handle 16, and a top rod 12 is jointed to the base rod 10 in a swing-out (telescopic) joint manner or in an ordinary joint manner. The top rod 12 includes a top guide 14 at the leading end thereof, the casting handle 16 includes a mounting device 20 for mounting a reel 18, and the base rod 10 includes a fishline introduction guide 24. A fishline 22 is introduced from the reel 18 into the interior of the fishing rod through the fishline introduction guide 24.

Figure 2:
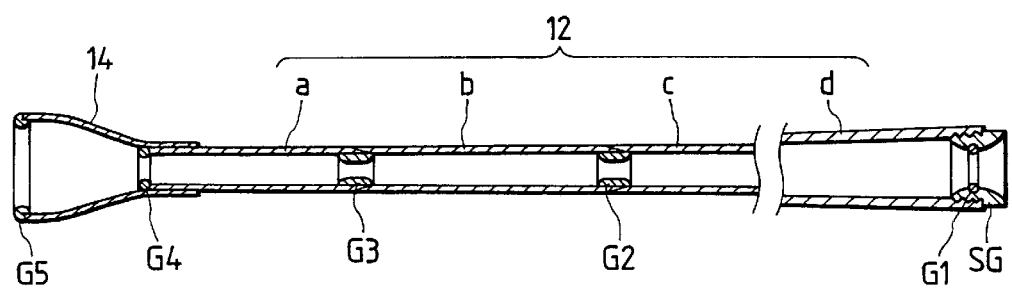
FIG. 2 is an enlarged longitudinal section view of a top rod shown in FIG. 1.
Figure 3:
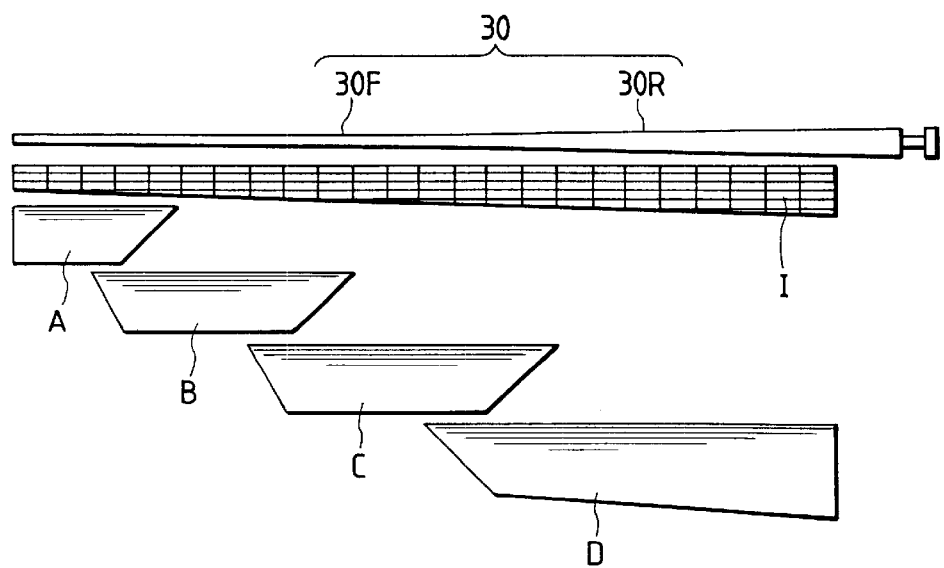
FIG. 3 is an explanatory view of the top rod shown in FIG. 2, illustrating a method of manufacturing the same.

FIG. 2 is an enlarged longitudinal section view of the top rod 12, showing a state thereof in which the structure of the invention is applied. Here, it should be noted that the present invention is not limited to a joint-type fishing rod of this kind but a single rod can also be employed in the invention. That is, the term "rod top portion" used in the invention does not always coincide with a rod tube generally referred to as a top rod, but it means the substantial rod top portion of a fishing rod. Therefore, the rod top portion can include No. 1, No. 2 and No. 3 rods from the front-most portion of a fishing rod, or can include only the front portion of No. 1 rod. Now, the top rod 12, which is manufactured according to a method shown in FIG. 3, is composed of four areas, that is, a front portion a, a middle front portion b, a middle portion c, and a base portion d.

Firstly, description will be given below of the above manufacturing method with reference to FIG. 3. A metal core 30 includes a substantially straight portion (corresponding to a rod top portion) 30F which is situated in the front half section of the metal core 30 and is tapered very gently, and a portion 30R which is situated in the rear half section and is tapered slightly greatly. It is preferable that the front portion 30F has a taper of ³⁄₁₀₀₀ or less which can be regarded as substantially straight. If the front portion 30F is formed in this manner, then the inside diameter of the rod top portion of a molded rod tube can be formed substantially straight. This makes it possible to increase the inside diameter of the front portion of the rod top portion, so that there can be provided a hollow portion through which a fishline can be passed freely. That is, it is possible to provide a fishline insertable structure which can reduce the insertion resistance of the fishline. Now, a reinforcing prepreg I, which is formed in a tape shape or in a sheet shape, is wound around the metal core 30. The reinforcing prepreg I may be mainly formed of fibers extending substantially in the circumferential direction of the rod top portion, or may be formed by combining ceramics fibers extending substantially in the axial direction of the rod top portion with a scrim sheet. In the latter case, the ceramics fibers not only can reduce the resistance of the fishline passing through the molded rod tube but also can prevent the inner surface of the rod tube against wear. However, the reinforcing layer or prepreg I is not shown in FIG. 2.

Next, a front portion prepreg A, the rear end portion of which is formed inclined, is wound around the reinforcing prepreg I, a middle front portion prepreg B with two end portions thereof formed inclined is wound around the prepreg A, a middle portion prepreg C with the two end portions thereof formed inclined is wound around the prepreg B, and finally a tapered base prepreg D with the front end portion thereof formed inclined is wound around the prepreg C. After then, the rod top portion 12 can be formed according to a conventionally known method. Referring here to a relation between the lengths of these prepregs, as shown in FIG. 3, A<B<C<D. If the rod top portion 12 is formed by winding the prepregs in the above-mentioned sequence, then the prepregs situated in the rear portion are higher in elasticity than the prepregs in the front portion. Not only due to this, but also since the rear portion is wound on the outer side of the front portion, preferably, it is easy to make a difference in rigidity between the front and rear portions, and the front portion is easy to flex, thereby making it possible to increase the inside diameter of the front portion. However, this is not limitative but, alternatively, the reinforcing prepreg I may be wound last to thereby reinforce the rod tube from the outer side thereof, or the prepregs A, B, C and D may be wound in the reversed order. Around the front portion 30F corresponding to the rod top portion, there are wound the prepreg A, prepreg B and the front half section of the prepreg C. In addition, the reinforcing prepreg I may be interposed between adjacent prepregs, for instance, between the prepreg B and the prepreg C.

The reinforcing fibers that are used in the respective prepregs A, B, C and D are different in the elastic modulus from one another, and the fibers are selected in such a manner that the respective elastic moduli thereof become higher sequentially in a geometric series manner from the front portion a toward the base portion d. For example, the elastic moduli of the prepregs A, B, C and D are selected to be 5000 kg/mm², 10000 kg/mm², 20000 kg/mm², and 40000 kg/mm² in this order. When it comes to the elastic moduli (kg/mm²) of fibers such as a carbon fiber, an alumina fiber, an aramide fiber, Techmiron (a brand name), a glass fiber, a steel fiber, a polyester fiber, and a nylon fiber, generally, they can be shown in the following order: that is, 70000–15000 (5000–90000), 25000 (10000–46000), 13400 (6900–16300), 9000–10000 (6000–10000), 7400 (6400–8730), 19400, 1100, and 500. In this manner, the elastic moduli of the fibers vary in a wide range (the elastic moduli shown in the parentheses point out the wider ranges thereof, respectively). By selecting these elastic moduli, almost desired values can be obtained.

Especially, since the carbon fiber exists in the range of approx. 90000–5000 or less, the prepregs can be formed of only the carbon fiber. The above-mentioned structure including different elastic moduli can also be combined with other embodiments to be described later. However, the term "geometric series manner" used in the invention does not mean that the elastic moduli must be set in the geometric series in a strict sense, but means that a considerable difference is allowed.

Among the carbon fibers, those which have an elastic modulus of 7000 or less and thus are low in elasticity are flexible to a considerable extent, and, because the breakage, elongation thereof is as much as 2%, they are difficult to break. Therefore, such carbon fibers can be conveniently used as a rod top portion or the front portion of a rod top portion. Especially, if they are used as reinforcing fibers extending in the axial direction, then the flexural rigidity of the rod top portion can be reduced. In actual use, there is used a prepreg which contains 50% or more by volume of such low elastic carbon fibers. The low elastic carbon fibers can also be used as reinforcing fibers in the following embodiments to be described later.

The thus formed top rod 12, including even its front portion, has an inside diameter of such a given size to allow a fishline to be freely inserted therethrough, and the more forwardly it is situated in the rod top portion, the more easily the area can be flexed. This makes it possible to provide an intra-line fishing rod which has a delicate flexural property. Referring to a relation between the lengths of the front portion a, middle front portion b, middle portion c and base portion d, it is preferable that a<b<c<d. This is because the tip action of the rod top portion is easy to play. Also, a relation in thickness between them is preferably a≦b<c<d. This is because a greater flexural force is applied as it approaches the base portion.

In the present embodiment, a guide ring G1 formed of ceramics and held by a hold member SG is provided in the rear end of the top rod 12. In this respect, as described before, since the flexural property of the top rod 12 is properly adjusted by use of materials having different elastic moduli, the inside diameter of the top rod 12 can be set rather large, which makes it easy to provide a guide ring of ceramics. In the connecting boundary portions between the respective adjacent portions a, b, c, and d as well, there are provided guide rings G2 and G3 respectively formed of ceramics, which not only reinforce the connecting boundary portions but also reduce the insertion resistance of the fishline. In the connecting boundary portion between the top guide 14 and top rod 12 as well, there is provided a similar guide ring G4 and, in the leading end of the top guide 14, there is also provided a guide ring G5 formed of ceramics.

Figure 4:
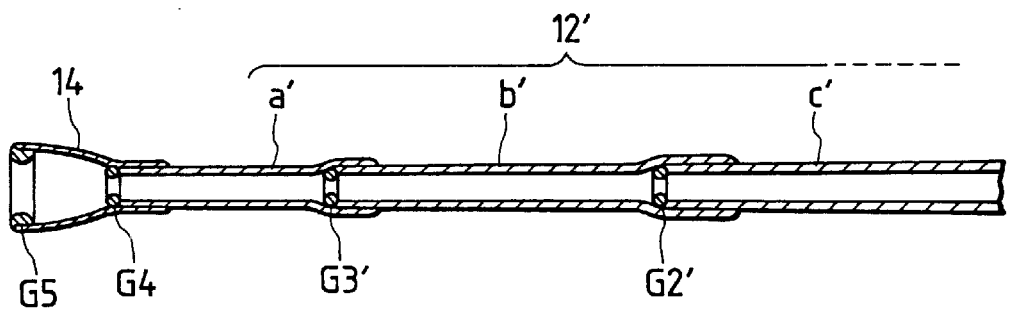
FIG. 4 is a longitudinal section view of another embodiment of a fishing rod according to the invention.

Now, FIG. 4 shows a top rod 12' which is another embodiment of the top rod 12 shown in FIG. 2. In this embodiment, area portions a', b', c' and d' provide a connection structure of a reversed ordinary joint type which is obtained by adhesion or by welding or melting. The reversed order joint type means a joint structure wherein the rearwardly located rod pipe is inserted into the inside of the forwardly located rod pipe. Of course, this is not limitative but, as in an ordinary joint structure, the respective area portions may be jointed either removably or fixedly in an ordinary manner or in a swing-out manner, or the ordinary joint structure may be fixed by adhesion. Further, they may be threadedly connected together so that they can be freely connected and removed. However, the connection structure according to the present embodiment is preferable because a large interior can be provided. Further, in the respective connection boundary end portions, similarly to the embodiment shown in FIG. 2, there are provided guide rings G2', G3' and the like. In this structure, the guide rings can be provided when the respective area portions a', b', c' and d' are connected together, that is, the guide rings can be provided easily. The front portion a' may be a pipe which is formed of synthetic resin. In addition, the length of each area portion, the number of the area portions to be combined, the degree of taper of each area portion or the like can be selected freely according to the purpose of the fishing rod. The other characteristics of the present connection structure are similar to the embodiment shown in FIG. 2.

Although in FIG. 2 there is used a prepreg which is composed of fibers having different elastic moduli, the invention is not limited to this but, for example, the prepreg may be formed of a single kind of fibers. That is, there can be provided an intra-line fishing rod using synthetic resin as a matrix and reinforced not only with reinforcing fibers extending substantially in the axial direction of the fishing rod within the range of angles of ±30° with respect to the axial direction thereof but also with reinforcing fibers extending substantially in the peripheral direction of the fishing rod within the range of angles of ±45° with respect to the circumferential direction thereof, in which the inside diameter of a rod top portion thereof is formed in a substantially straight shape having an inclination of 3/1000 or less or in a gently tapered shape having an inclination of the order of 6/1000, and also in which the ratio of the reinforcing fibers extending substantially in the peripheral direction is set for 50% or more in the front portion of the rod top portion while the ratio thereof is set for 20% or less in the rear portion of the rod top portion, and the quantity (50% or less) of the reinforcing fibers extending substantially in the axial direction in the front portion of the rod top portion is set smaller than the quantity (80% or more) of the same reinforcing fibers in the rear portion of the rod top portion, so that the rod top portion becomes easier to flex toward the front portion thereof. That is, the present fishing rod with an inserted fishline provides a similar flexure property to a fishing rod with an inserted fishline which has a tapered delicate rod top portion. Also, since the inside diameter of the rod top portion is formed substantially straight, the inside diameter of the front portion of the rod top portion can be formed large and thus there can be provided a hollow portion through which a fishline can freely pass, whereby there can be provided a fishline insertion structure in which the insertion resistance of the fishline is reduced.

According to the invention, including the above embodiments, if, as the reinforcing fibers extending in the peripheral direction, there are used reinforcing fibers which are higher in elasticity than the reinforcing fibers extending in the axial direction, then the resultant flexural rigidity of the rod top portion is low, the flexure of the rod top portions is delicate while the rod top portion is highly strong against crushing, the rod top portion can be made thin in thickness and large in diameter, and the rod top portion can be reduced in weight.

Figure 5:
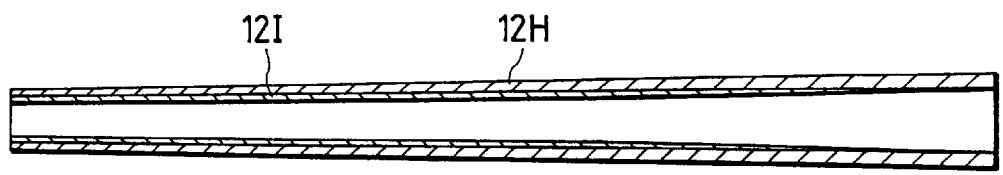
FIG. 5 is a longitudinal section view of another embodiment of a fishing rod according to the invention.

Now, FIG. 5 shows another embodiment of a top rod including a rod top portion according to the invention. In this embodiment, there is provided an intra-line fishing rod using synthetic resin as a matrix, reinforced with reinforcing fibers and including a main body layer 12H having reinforcing fibers extending substantially in the axial direction thereof, in which the front portion of the main body layer 12H of the top rod thereof is formed thin while the rear portion of the main body layer 12H is formed thick, a resin layer 12I including a thick front portion and a thin rear portion is formed integrally with the inside of the top rod main body layer 12H, and the inside diameter of a rod top portion consisting of a substantially front half section of FIG. 5 is formed in a substantially straight shape having an inclination of 3/1000 or less or in a gently tapered shape having an inclination up to the order of 6/1000. Thus, the combination of the main body layer 12H and resin layer 12I makes the rod top portion in which the amount of the reinforcing fibers extending substantially in said axial direction in the front portion of the rod top portion is set smaller while the amount of said reinforcing fibers in the rear portion of the rod top portion is set greater, the ratio of the synthetic resin relative to the reinforcing fibers in the front portion of the rod top portion is set greater while the ratio of the synthetic resin relative to the reinforcing fibers in the rear portion of the rod top portion is set smaller. Owing to this arrangement, there can be provided a fishline insertion structure in which the inside diameter of the front portion of the rod top portion can be formed large and there can be obtained a hollow portion through which the fishline can pass freely, thereby being able to reduce the insertion resistance of the fishline. In this structure, the flexural property of the rod top portion becomes higher toward the front portion of the rod top portion, the rod top portion can provide a similar delicate flexural property to the tapered rod top portion, and the crushing strength as a tube of the thin portion of the main body layer 12H is reinforced with the resin layer 12I. As the synthetic resin of the resin layer 12I, preferably, there may be used resin which allows the fishline to slide smoothly thereon, such as silicone, fluorine or the like. Also, instead of the resin layer 12I, there can be formed and used a reinforcing layer which consists mainly of reinforcing fibers extending substantially in the circumferential direction of the main body layer 12H.

Figure 6:
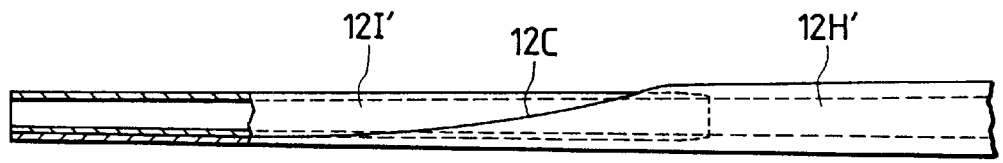
FIG. 6 is a longitudinal section view of another embodiment of a fishing rod according to the invention.

Next, FIG. 6 shows another embodiment of a rod top portion according to the invention. In this embodiment, a rod top portion main body layer 12H' uses synthetic resin as a matrix and is reinforced with reinforcing fibers extending at least substantially in the axial direction thereof. The rear portion of the rod top portion main body layer 12H' has a tubular shape, whereas the main body layer 12H' includes an inclined cut portion 12C which, as shown in FIG. 6, is cut more deeply toward the front portion thereof. And, a cylindrical member 12I' consisting mainly of synthetic resin is fixed integrally to the inner periphery of the rod top portion main body layer 12H' by adhesion or the like in such a manner that it can cover the cut portion 12C. The inner surface of the cylindrical member and the inner surface of the rear portion of the top rod portion main body layer are formed in such a manner that there is no level difference between them. And, the rod top portion main body layer, including the rear portion to the front portion thereof, is formed in a substantially straight shape having an inclination of $3/1000$ or less or in a gently tapered shape having an inclination up to the order of $6/1000$. Therefore, there can be provided a fishline insertion structure which includes a hollow portion allowing the fishline to be inserted freely therethrough and also which can reduce the insertion resistance of the fishline. Also, since the main body layer of the present rod top portion becomes smaller in quantity toward the front portion thereof, the present rod top portion can flex well and can provide a similar delicate flexural property to the tapered rod top portion.

Although the cylindrical member 12I' consists mainly of synthetic resin, it may be reinforced with short fibers such as "Whisker" (a brand name) or with particles, or it may include an inner surface which is improved in the fishline slidability. Further, it may be a cylindrical body which is formed of restitutive rubber or elastomer resin, or synthetic resin tape may be wound several times around the cylindrical member 12I'.

In the above-mentioned respective embodiments, for the most part, the synthetic resin as a matrix is used with a ratio of 40% or less by volume. However, alternatively, after the front portion of the rod top portion may be set for 60% or more and the rear portion thereof may be set for about 25%, their relative ratios may be changed gradually. In this case, the fibers extending substantially in the axial direction become smaller in quantity toward the front portion of the rod top portion and, for this reason, even when the rod top portion uses a single kind of reinforcing fibers and synthetic resin, the rod top portion can provide a flexural property almost similar to the embodiments shown in FIGS. 5 and 6.

Figure 7:
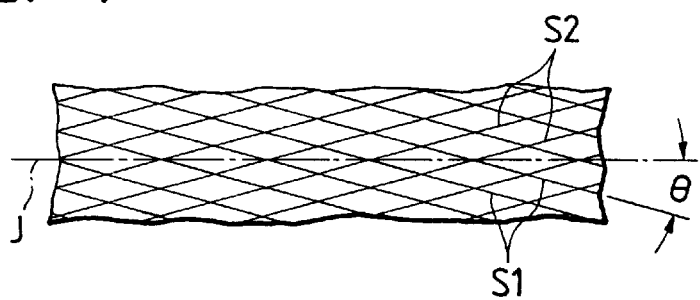
FIG. 7 is a partially enlarged plan view of another embodiment of a fishing rod according to the invention.

Now, FIG. 7 shows a partially enlarged view of a rod top portion according to the invention, in which reinforcing fibers S1 and S2 respectively inclined by an angle of θ with respect to the axial direction J of the rod top portion are arranged substantially symmetrically so that they cross each other. In the present embodiment, the angle θ is 15° and, in particular, the angle θ may be set in the range of 5° to 25°. Also, although there are not arranged reinforcing fibers extending in the axial direction or reinforcing fibers extending in the circumferential direction, they may be arranged in small quantity. It is preferable to use low elastic reinforcing fibers having an elastic modulus of 20000 kg/mm² or less.

In the rod top portion having the above structure, the flexural rigidity thereof can be reduced, the inside diameter thereof can be made large, and the insertion resistance of the fishline can be reduced while keeping the delicate flexural tone thereof. Also, since the reinforcing fibers are arranged obliquely, they have some components which contribute to the circumferential direction, thereby being able to prevent the rod top portion against crushing rupture. Further, they have some components to contribute to the longitudinal direction, thereby being able to prevent the rod top portion against plastic deformation.

Now, a rod top portion according to the invention is structured such that not only the reinforcing fibers S1 and 52 crossing each other and shown in FIG. 7 are arranged but also reinforcing fibers such as carbon fibers or the like are arranged in the axial direction J. In this case, the angle θ is 5° or greater, preferably, the angle θ may be set 15° or greater. This is because the rod top portion can be made easy to flex, in order to prevent the plastic deformation of the rod top portion. Also, the axially extending fibers are used in smaller quantity than the crossing fibers, or reinforcing fibers having a lower elastic modulus are used as the axially extending fibers, thereby making delicate the flexure of the rod top portion. The elastic modulus of the axially extending,,fibers should be 24000 kg/mm² at most, so that the flexural rigidity of the rod top portion can be reduced.

Since the reinforcing fibers are arranged in a three dimensional manner as described above, the rod top portion is strong against crushing or twisting. Similarly to be above embodiments, the flexural rigidity of the rod top portion is low, the inside diameter of the rod top portion can be made large, and the insertion resistance of the fishline can be reduced.

The rod top portion must have a low flexural rigidity and must be strong against crushing. This can be attained by a laminated structure in which the reinforcing fibers arranged in the axial direction are combined with woven cloth. In this structure, the existence of the peripherally extending fibers of the woven cloth increases the crushing strength. And, since all of the reinforcing fibers do not contribute to the flexural rigidity, the flexural rigidity obtained is small for the quantity of the reinforcing fibers used and thus the inside diameter of the rod top portion can be formed large. On the other hand, the rod top portion can be formed thick for the flexural rigidity, so that, even if the rod top portion flexes greatly, it is difficult to be crushed or broken.

Preferably, the woven cloth may have a low fiber ratio in which a ratio of synthetic resin is 50% or more and the arranging fibers may have a high fiber ratio in which a ratio of synthetic resin is 45% or less. Also, if the quantity of the woven cloth is larger than the quantity of the arranging fibers, then the rod top portion can be formed large to thereby enhance the crushing strength thereof without increasing the flexural rigidity thereof (that is, not only the rod top portion can provide a delicate flexural property but also the inside diameter of the rod top portion can be increased).

For example, glass fibers are used for the woven cloth to thereby reduce the elastic modulus of the rod top portion, and carbon fibers (having an elastic modulus of 24000 kg/mm² or less) are used for the arranging fibers, while their respective synthetic resin ratios are set for 35% or more and the ratio of the synthetic resin in the woven cloth is set greater than the ratio of the synthetic resin in the arranging fibers. Also, the thickness of the laminated layer of the woven cloth is set for 0.06 mm, while the thickness of the laminated layer of the arranging fibers is set for 0.03 mm.

Also, instead of the arranging fibers, there can also be used reinforcing fibers arranged crossingly at the angle θ, which has been described with reference to FIG. 7, of 25° (the angle in the range of 15°–45°), that is, such reinforcing fibers may be used in combination with woven cloth including fibers which extend in the axial direction of the rod top portion).

Now, in a rod top portion according to the invention reinforcing fibers having a low elongation (a high elasticity) are disposed in the inside thereof and reinforcing fibers having a high elongation (a low elasticity). Due to this, not only the rod top portion can be formed such that it is easy to flex and the inside diameter thereof can be formed large, but also, when it is flexed greatly, the rod top portion can be prevented from being deformed plastically.

Figure 8:
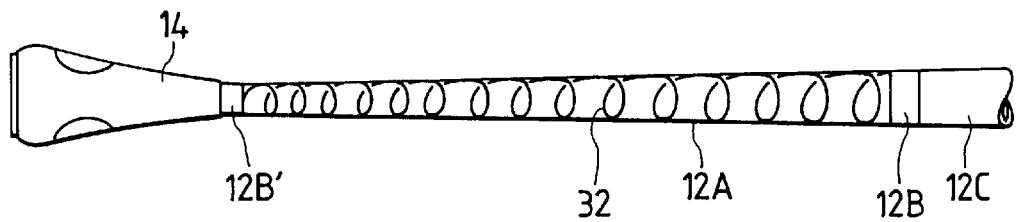
FIG. 8 is a partially perspective side view of another embodiment of a fishing rod according to the invention.

Next, referring to a rod top portion according to the invention as shown in FIG. 8, the rod top portion includes a spirally shaped member 32 formed of fiber reinforced resin, fiber reinforced metal, metal, ceramics, synthetic resin or the like to thereby reduce the insertion resistance of the fishline, that is, the fishline can be inserted through the spirally shaped member 32. On the outside of the spirally shaped member 32, there is placed a cylindrical member 12A which is formed of material lower in elasticity than the spirally shaped member 32. That is, the cylindrical member 12A is structured not only in order not to impede the flexure of the spirally shaped member 32 but also in order to prevent the fishline from being twined around the outside of the spirally shaped member 32. Due to this, the inside diameter of the rod top portion can be formed large while keeping the delicate flexural property thereof, and the fishline insertion resistance can be reduced. Further, the cylindrical member 12A is difficult to be crushed because of the existence of the spirally shaped member 32.

The cylindrical member 12A is connected to a rear rod tube 12C through a connecting portion 12B which holds the rear end of the spirally shaped member 32, while the front portion of the cylindrical member 12A is connected to a top guide 14 through a connecting portion 12B' holding the front end of the spirally shaped member 32.

Figure 9:
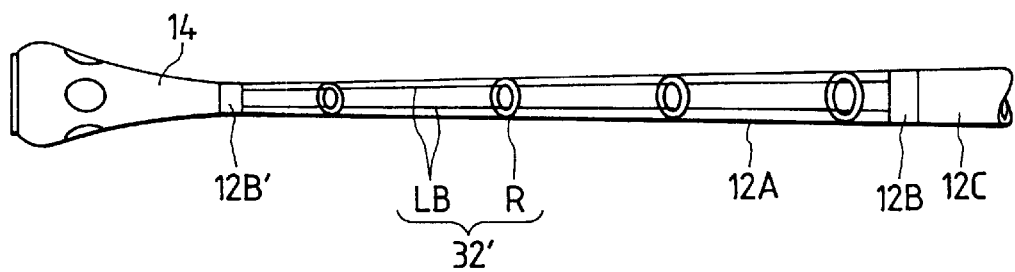
FIG. 9 is a partially perspective side view of another embodiment of a fishing rod according to the invention.

In FIG. 9, a spirally shaped member 32' is composed of a plurality of guide rings R formed of ceramics or the like, and a longitudinal member LB formed of a wire or the like for connecting together the guide rings R. And, the remaining portions of the spirally shaped member 32' are similar to the embodiment shown in FIG. 8.

Figure 10:
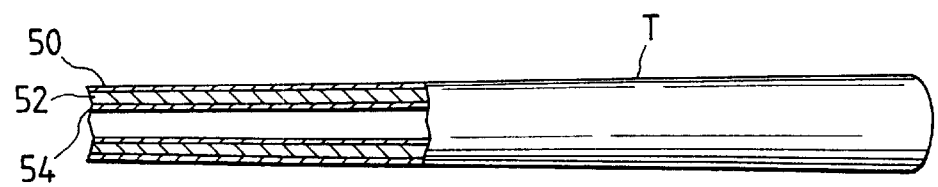
FIG. 10 is a partially longitudinal section view of another embodiment of a fishing rod according to the invention.

FIG. 10 shows a rod top portion T according to another embodiment of the present invention. The rod top portion T made up of three layers, i.e. an outer layer 50, an inner layer 54 and an intermediate layer 52 radially interposed between the outer and inner layers 50, 54. Each of the inner and outer layers 50 and 54 is formed by a braided bag which is obtained by braiding or weaving a plurality of fibrous threads or tapes as warp and weft into a hollow configuration. The braided bag in the hollow configuration may be preliminary obtained and then wrapped around the metal core, or otherwise the fibrous threads or tapes may be braided around the metal core to cover the metal core. Each fibrous threads or tapes is made up of several thousands inorganic or organic fibers such as aramid fibers, polyether imide fibers, glass fibers, low-elastic module carbon fibers or the like bundled by resinous material. In the present embodiment, twelve fibrous threads are braided tightly with six threads as warp and the reminder six as weft so that each of fibrous threads is arranged obliquely with respect to the longitudinal direction of the rod top portion T. The fibrous threads may be braided loosely. Because of this oblique arrangement and braiding of the fibrous threads, the rod top portion T can bear against the breakage even though it is bent greatly.

In contrast, the intermediate layer 52 is made of material containing a relatively large quantity of synthetic resin (preferably, not smaller than 50% by weight) and longitudinally extended organic or inorganic fibers such as glass fibers, low-elastic module carbon fibers or the like. The circumferentially extended fibers may be included in the material for the intermediate layer 52. The purpose of the provision of this intermediate layer 52 having the longitudinally extended fibers is to prevent the plastic deformation of the rod top portion T when it is bent greatly.

In the embodiment shown in FIG. 10, the radial thickness of the outer, intermediate and inner layer is set at a ratio of 1:3:1, but may be varied according to the object of the fishing rod. Further, one of the outer and inner layers 50 and 52 may be omitted as long as the desired anti-breakage and anti-plastic deformation properties are obtained. Moreover, a prepreg layer containing circumferentially extended reinforcing fibers may be provided on an inside or outside of the intermediate layer 52, an inside of the inner layer 54 or an outside of the outer layer 50.

As can be clearly understood from the foregoing description, according to the invention, a fishing rod having a delicate flexible characteristic can be structured as an intra-line fishing rod which not only can keep its delicate flexible characteristic but also can reduce a fishline insertion resistance.

What is claimed is:

1. An intra-line fishing rod including a rod top portion, said rod top portion extending in an axial direction and being structured such that synthetic resin is used as a matrix, reinforcing fibers are disposed such that they extend in an inclined direction with an angle of inclination of at least 5 degrees with respect to the axial direction of said rod top portion and also such that they cross each other from both right and left directions substantially symmetrical with respect to said axial direction, and a smaller amount of reinforcing fibers than the amount of said crossing reinforcing fibers are disposed so as to extend substantially in said axial direction, wherein the reinforcing fibers having a lower elastic modulus than said crossing reinforcing fibers are disposed so as to extend substantially in said axial direction.

* * * * *